UNITED STATES PATENT OFFICE.

CHARLES J. HERRING, OF MEMPHIS, TENNESSEE.

COMPOUND FOR SPRAYING FRUIT-TREES.

No. 875,525.　　　　Specification of Letters Patent.　　　Patented Dec. 31, 1907.

Application filed August 8, 1907. Serial No. 387,666.

*To all whom it may concern:*

Be it known that I, CHARLES J. HERRING, a citizen of the United States, residing at Memphis, in the county of Shelby and State of Tennessee, have invented certain new and useful Improvements in Compounds for Spraying Fruit-Trees; and I do declare the following to be a full, clear, and exact description of the invention, such as will enable others skilled in the art to which it appertains to make and use the same.

This invention relates to an improved composition to be sprayed or otherwise applied to fruit trees for curing blight and for destroying scale insects.

The object of the invention is to provide a cheap and efficient compound which will effectually do the work with few applications and with little danger to the trees. In this connection it is well to say that it is preferable to use the compound before the trees have started to bear, or bloom, or after they have borne their fruit.

Briefly stated, the invention consists in combining suitable portions of sodium chlorid with corrosive sublimate and mercuric sulfid, the latter being obtained by intimately mixing flowers of sulfur and metallic mercury. The above ingredients are held in temporary suspension in, say five hundred to five thousand parts of water, according to circumstances and conditions.

The ingredients above named are thoroughly sprayed or otherwise applied to the trees for curing blight and for destroying scale insects.

In producing the compound I take one part of common salt (sodium chlorid), metallic mercury, two parts; corrosive sublimate, 8 parts; sulfur, one part, and water five hundred to five thousand parts. The sulfur and mercury are thoroughly mixed and ground together in a mortar, thus producing the mercuric sulfid, and the salt and corrosive sublimate are then added. After the parts have been thoroughly mixed in a dry state, they are used in water for spraying or washing the trees.

Having thus described my invention, what I claim as new and desire to secure by Letters Patent, is:

A composition for spraying fruit trees consisting of a mixture of sodium chlorid, 1 part; mercuric sulfid, 2.3 parts; corrosive sublimate, 8 parts; sulfur, 7 tenths part, and water 500 to 5000 parts.

In testimony whereof I have hereunto set my hand in presence of two subscribing witnesses.

CHARLES J. HERRING.

Witnesses:
　J. H. BURRET,
　E. B. CRENSHAW.